United States Patent [19]
Maier et al.

[11] Patent Number: 5,793,905
[45] Date of Patent: Aug. 11, 1998

[54] METHOD AND DEVICE FOR SWITCHING OF OPTICAL RADIATIONS OF ORTHOGONAL POLARIZATIONS

[75] Inventors: Alexandr Alexandrovich Maier; Konstantin Yurievich Sitarsky, both of Moscow, Russian Federation

[73] Assignee: Maier Optical Research and Technologies GmbH, Walchwil, Switzerland

[21] Appl. No.: 776,204

[22] PCT Filed: Jun. 21, 1995

[86] PCT No.: PCT/RU95/00131

§ 371 Date: Feb. 18, 1997

§ 102(e) Date: Feb. 18, 1997

[87] PCT Pub. No.: WO96/01441

PCT Pub. Date: Jan. 18, 1996

[30] Foreign Application Priority Data

Jul. 5, 1994 [RU] Russian Federation ............ 94025344

[51] Int. Cl.$^6$ ........................................... G02B 6/26
[52] U.S. Cl. .................. 385/16; 385/11; 385/31; 359/322; 359/256
[58] Field of Search ................ 385/16, 22, 23, 385/31, 11, 12, 13, 14; 359/246, 247, 250, 256, 259, 322

[56] References Cited

U.S. PATENT DOCUMENTS

| | | | |
|---|---|---|---|
| 4,919,522 | 4/1990 | Nelson | 359/246 |
| 5,090,824 | 2/1992 | Nelson et al. | 385/22 |
| 5,305,136 | 4/1994 | Smith | 359/247 |

FOREIGN PATENT DOCUMENTS

| | | | |
|---|---|---|---|
| 198245 | 10/1986 | European Pat. Off. | |
| 3-36407 | 5/1991 | Japan | |
| 2125543 | 3/1984 | United Kingdom | |

OTHER PUBLICATIONS

Quantum Electronics, 1982, vol. 9, No. 11, pp. 2296–2302.

Transactions of the Academy of Sciences of the USSR, Ser. Phys., 1984, vol. 48, No., 7, pp. 1441–1446.

*Primary Examiner*—Phan T. H. Palmer
*Attorney, Agent, or Firm*—Collard & Roe, P.C.

[57] ABSTRACT

The method for switching optical radiations having orthogonal polarization includes the steps of inserting a linearly polarized wave into the input of a birefringent object (an optical waveguide or crystal) and feeding a small polarized small optical signal is also orthogonally into the object. The polarization vector of the linearly polarized pumping signal or of the optical signal is directed along an optical axis of the birefringent object or at a small angle to the optical axis. The pumping intensity is selected to be higher than the threshold value $I_p$, which is proportional to a difference between the effective refractive indices of orthogonally polarized radiations and inversely proportional to a cubic nonlinear coefficient of the object. In addition, the intensity of the optical signal radiation is varied from zero to a maximum value of $<0.1\ I_p$. The device that carries this method into effect includes a birefringent object, an optical pumping source, an optical signal source, a mixer and a polarizer. The source of optical pumping radiation is linearly polarized either along the optical axis of the object or normal to the mentioned optical axis. In addition, the source of the optical signal is polarized either normal to the mentioned optical axis of the object or along it. Finally, the polarizer spatially separates radiations of orthogonal polarizations while the intensity of the optical pumping radiation introduced into the object is selected to be higher than the threshold value.

13 Claims, 3 Drawing Sheets

METHOD AND DEVICE FOR SWITCHING OF OPTICAL RADIATIONS OF ORTHOGONAL POLARIZATIONS

TECHNICAL FIELD

The present invention relates in general to nonlinear integral and fiber optics and more specifically to completely optical switches and optical (optoelectronic) transistors.

BACKGROUND ART

In a heretofore-known method for switching unidirectional distributively-coupled waves having orthogonal polarizations, a powerful optical radiation (hereinafter referred to as "pumping") is fed to the Input of a birefringent nonlinear object (optical waveguide or crystal), featuring effective refractive indices of an ordinary and an extraordinary wave $n_o$ and $n_e$, respectively, and a cubic nonlinearity coefficient $\theta$, said radiation being characterized by an intensity $>0.4 \cdot |n_o-n_e|/|\theta|$, a field (polarization) vector directed at an angle $\pi/4$ to the optical axis of said object, concurrently with feeding a linearly polarized optical signal radiation (hereinafter referred to as "signal"), said radiation having an intensity which is by at least one order of magnitude lower than the intensity of pumping and being polarized orthogonally to the pumping, and the intensity of said signal is varied within the zero and the maximum value. As a result, there is established a linear distributed coupling between the signal and the pumping, and the ratio between the intensity values of the waves of various polarizations at the output of said object is drastically changed (cf. "Quantum electronics", 1982, vol.9, No.11 /Radio i sviaz PH, Moscow/, pp.2296–2302, A. A. Maier, "Optical transistors and bistable elements based on nonlinear luminous transmission by systems with unidirectional coupled waves").

One prior-art device (JP 3-36407, Int. Cl. G02F 3/00, 1984) is known to comprise a polarizer, a birefringent crystal, and an analyzer at the output, the direction of polarization of an incident light as set by the polarizer, makes up an angle of $\pi/4$ with the axis of optical anisotropy of the crystal.

However, the aforesaid known method places limitation upon the value of the amplification factor of a variable signal and involves some difficulties in orienting the object.

BRIEF DESCRIPTION OF THE DRAWINGS

The present inventions Is illustrated by the following drawings, wherein.

$$L = 2\pi\gamma/\Delta\beta = 1.6\pi, \gamma = \sqrt{\alpha^2 + K^2} \ ;$$

curve 1 - with $K/\alpha = 0, ctg(\phi_0) = 0$ curve 2 - with $K/\alpha = 0, ctg(\phi_0) = -1/\sqrt{R-1}$ curve 3 - with $K/\alpha = 0.0005, ctg(\phi_0) = 0$.

Figure 3:
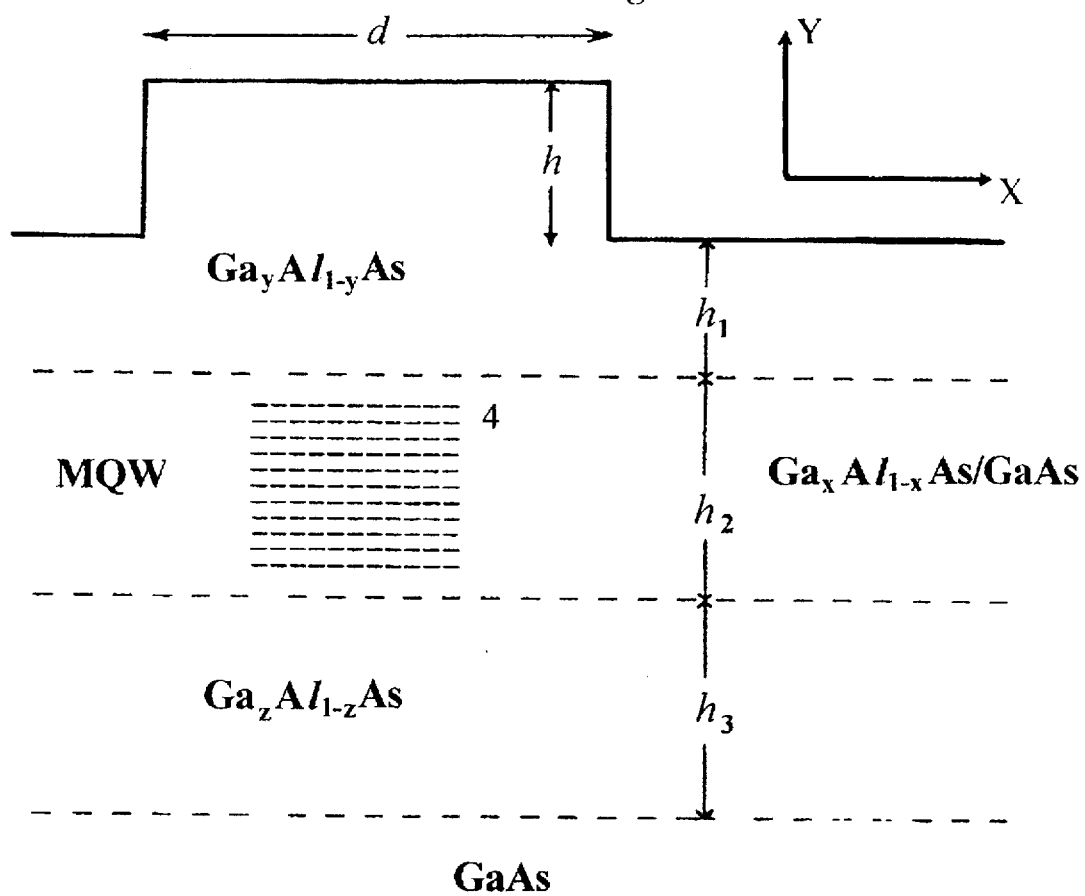
Figure 4:
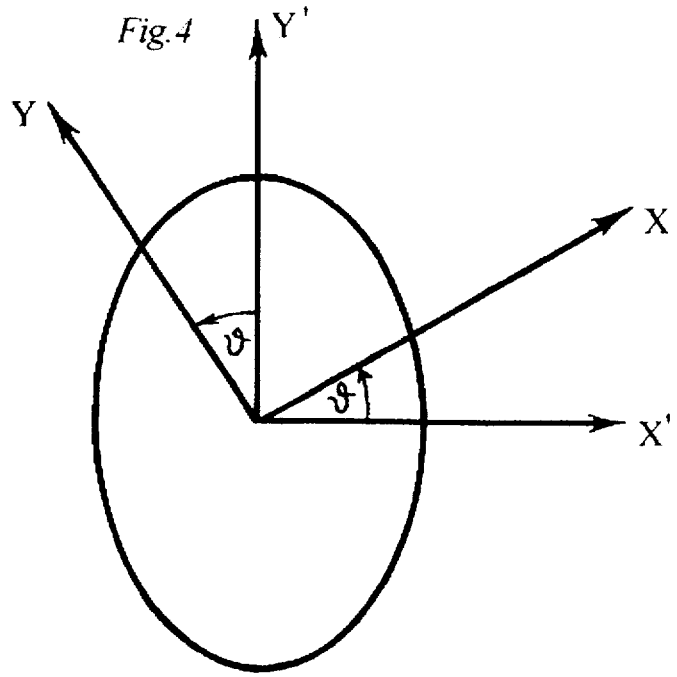
Figure 5:
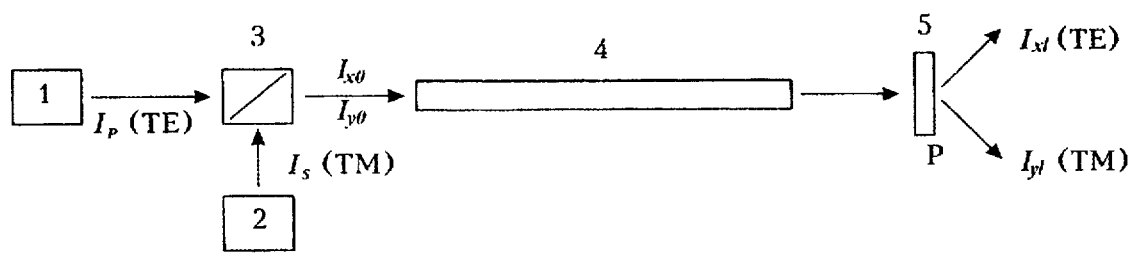

FIG. 3 is a cross-sectional view of a nonlinear birefringent optical waveguide 4 with a light-carrying laminar structure, e.g., of the type of $GaAs\text{-}Ga_xAl_{1-x}As$ forming a multiplicity of quantum wells (MQW). h . . . h3—thickness values of layers from 0 to 10 microns;

FIG. 4 shows a distribution of an effective refractive index in a cross-section of the object 4 (e.g., a birefringent fiber guide);

FIG. 5 is a schematic view of a device for carrying into effect the proposed method of switching of optical radiations having orthogonal polarizations showing a general pattern with pumping polarization along the optical axis of the object 4.

Figure 6:
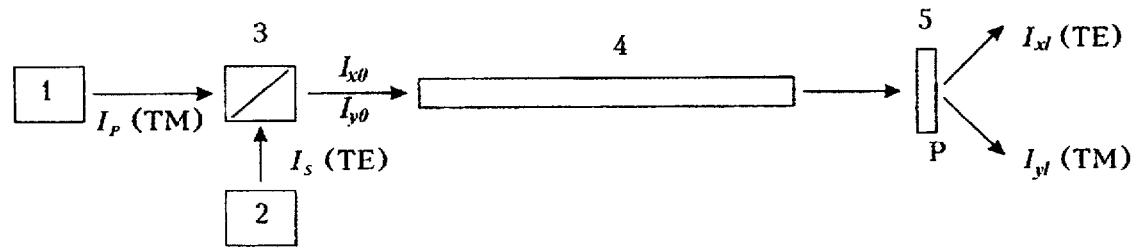

FIG. 6 same as in FIG. 5, with pumping polarization normal to the optical axis of the object 4.

DISCLOSURE OF THE INVENTION

A positive technical result of the present invention is expressed in a higher of amplification factor of a change in the signal intensity and provision of favorable conditions for creating an optical transistor, as well as devices based thereon.

The foregoing technical result is attained due to the fact that in a known method for switching optical radiations having orthogonal polarizations, according to the invention, the polarization vector of a linearly polarized pumping, or of a signal polarized orthogonally to said pumping, is directed along an optical axis of a birefringent object 4 (an optical waveguide or a crystal), thereby eliminating a linear coupling between the radiations of orthogonal polarizations, and the pumping intensity is selected to be higher than the threshold value which can be found from the following formula:

$$I_p > 2|\theta|^{-1}|\alpha|,$$

where $\theta$—is the cubic nonlinear coefficient (factor) of the object;

$\alpha = n_o - n_e$—a difference between the effective refractive indices of orthogonally polarized radiations, and the signal intensity is varied from zero to a maximum value of $I_{s,max} < 0.1 I_p$.

With a view to simplifying object orientation and provision a possibility of controlling the amplification factor of a change in the signal intensity, the polarization vector of a linearly polarized pumping or of a linearly polarized signal orthogonal to said pumping is deflected from the optical axis of the object by an angle lower than $\pi/10$, thereby establishing in the system a small linear coupling coefficient K between the radiations of orthogonal polarizations $K << |\alpha|$, said coefficient of coupling being amenable to variation by changing, e.g., the angle of rotation of the object, thus controlling the amplification factor of a change in the signal intensity.

A device for carrying said method into effect comprising a birefringent object 4 (optical waveguide or crystal) and a polarizer 5 separating radiations of orthogonal polarizations, according to the invention, is also provided with a source 1 of pumping linearly polarized either along the optical axis of the object 4 or normal to said axis, a source 2 of signal linearly polarized either normal to said optical axis or along it, and a mixer 3, where a signal and a pumping are spatially coincided, the pumping intensity introduced into the object 4 is to be higher than the aforesaid threshold value.

In order to simplify the object orientation and to provide a possibility of controlling the amplification factor of a change in the signal intensity, the device has a source of linearly polarized optical pumping radiation, having the polarization vector deflecting from the optical axis or from an axis orthogonal thereto, by an angle smaller than $\pi/10$.

Interaction between the unidirectional distribution-coupled waves having two orthogonal polarizations in a birefringent cubic nonlinear crystal or waveguide having intensities $I_x$, $I_y$ and phases $\psi_x$, $\psi_y$ in a coordinate system revolved with respect to the principal crystal or waveguide axes through an angle $\theta$ (FIG. 1), is described by the following equations:

$$\begin{cases} I'_x = -K\sqrt{I_x I_y}\ \sin(\phi) - \tilde{\theta} I_x I_y \sin(2\phi) \\ I'_y = K\sqrt{I_x I_y}\ \sin(\phi) + \tilde{\theta} I_x I_y \sin(2\phi) \\ 2(\phi' - \alpha) = K\cos(\phi)\dfrac{(I_x - I_y)}{\sqrt{I_x I_y}} + \\ \tilde{\theta}(I_x - I_y)\cos(2\phi) + \theta_y I_y - \theta_x I_x + \theta_{yx} I_x - \theta_{xy} I_y \end{cases} \quad (1)$$

where $$\psi = \alpha\zeta + \psi_y - \psi_x,$$

prime means differentiating with respect to $\zeta \equiv z\omega/c$;

z—the coordinate lengthwise the direction of wave propagation;

$K = |n_o - n_e|\sin(2\theta)$—the coupling coefficient;

$\alpha = \beta_y - \beta_x = (n_o - n_e)\cos(2\theta)$—difference between the refractive indices of waves having polarizations along axes x and y;

$\theta_x$, $\theta_y$, $\theta_{xy} = \theta_{yx}$, $\tilde{\theta}$—nonlinear coefficients (factors).

We have managed to derive a special transformation of variables which simplifies the above equations and makes it possible to find their analytical solution:

$$\xi = \xi_0 - \dfrac{\alpha}{\gamma}\ \dfrac{2\rho}{I_n}\ r^2 [sn^2(S,r) - sn^2(s_0,r)] + \quad (2)$$

$$\dfrac{K}{\gamma}\ \dfrac{2\rho}{I_n}\ r[sn(S,r)dn(S,r) - sn(s_0,r)dn(s_0,r)]$$

$$\eta = \eta_0 - \dfrac{K}{\gamma}\ \dfrac{2\rho}{I_n}\ r^2 [sn^2(S,r) - sn^2(s_0,r)] -$$

$$\dfrac{\alpha}{\gamma}\ \dfrac{2\rho}{I_n}\ r[sn(S,r)dn(S,r) - sn(s_0,r)dn(s_0,r)],$$

Where there are introduced normalized Stokes' parameters $$\xi = (I_y - I_x)/I,\ \eta = 2\cos(\phi)\sqrt{I_x I_y}\ /I = \cos(\phi)\sqrt{1 - \xi^2}\ ;$$

$$I = I_x + I_y, I_n = \theta I/3, \gamma = \sqrt{\alpha^2 + K^2}\ ,$$

$$\rho^2 = (I_n\xi_0 + \alpha)^2 + (I_n\eta_0 + K)^2 = \gamma^2 + I_n(2\alpha\xi_0 + 2K\eta_0 + I_n u_0),$$

$$\xi_0 = \xi(z = 0),$$

$$\eta_0 = \eta(z = 0), u_0 =$$

$$\xi_0^2 + \eta_0^2, S = s + s_0, s_0 \equiv F(x_0, r) - \text{an incomplete elliptical intergral,}$$

$$x_0 = \arcsin\left(\dfrac{2(K\xi_0 - \alpha\eta_0)}{I_n\sqrt{(1 - u_b)(u_a - u_0)}}\right),$$

$$u_a = I_n^{-2}(\gamma + \rho)^2, u_b = I_n^{-2}(\gamma - \rho)^2,$$

$$s = \sqrt{\gamma\rho}\ I\omega/c,$$

$l$ - length of specimen (is evident that $l$ can be regarded as the current coordinate z), -continued $$r^2 = \dfrac{I_n^2 - (\gamma - \rho)^2}{4\rho\gamma} = 1 - r_1^2,$$

$$r_1^2 = \dfrac{(\gamma + \rho)^2 - I_n^2}{4\rho\gamma}\ .$$

The above solution (2) is true for any initial conditions $I_{x0} = I_x(z=0)$, $I_{y0} = I_y(z=0)$, $\psi_0 = \psi(z=0)$ and for any values of K and $\alpha$.

As it is known commonly (cf., e.g., Transactions of the Academy of Sciences of the USSR, Ser. Phys., 1984, vol.48, No.7, pp.1441–1446, A. A. Maier "Self-switching in integral optics" (in Russian), self-switching of unidirectional distributively-coupled waves occurs provided r=1 or $r_1$=0 (the self-switching midpoint M), that is, in this particular case provided that $$\gamma + \rho = I_n l, \quad (3)$$

whence to determine In at the self-switching midpoint M:

$$I_{nM}(1 - \xi_0^2 - \eta_0^2) = 2[\alpha\xi_0 + K\eta_0 + \gamma\text{sign}(\theta)] \quad (4)$$

Solution of (2) is determined by two key members for which the approximations hold true in the region of self-switching (cf., e.g., Transactions of the Academy of Sciences of the USSR, Ser.Phys., 1984, vol.48, No.7, pp.1441–1446):

$$sn(S,r)dn(S,r) \simeq \dfrac{2U(1 - U^2)}{(1 + U^2)^2}\ , \quad (5)$$

$$sn^2(S,r) \simeq \dfrac{(1 - U^2)^2}{(1 + U^2)^2}\ ,$$

where $U = r_1^2 \exp(S)/16$.

Figure 1:
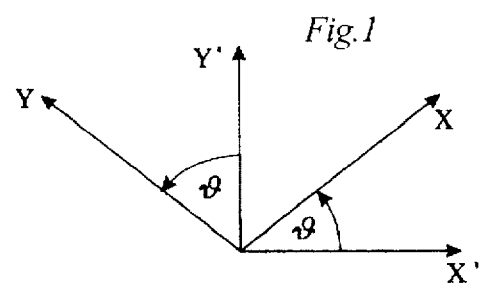
FIG. 1 shows an X,Y orientation of polarization with respect to the principal optic axes X'Y' of the object.

An emphasis is placed in the present invention on a special case where K=0, which is realized with $\theta$=0 or $\theta$=π/2 (FIG. 1). In this case the intensity values (expressed by $\xi$) are described by a member in (2) directly proportional to $sn^2(S,r)$, which reaches extreme values 0 and 1 with $U^2$=1 and U=0, respectively.

In the given particular case (K=0) the self-switching condition (3,4) is satisfied with:

$$I_n l > \gamma l \xi_0 = -\text{sign}(\theta)\text{sign}(\alpha),\ \eta_0 = 0. \quad (6)$$

With $\cos(\psi_0)$=0 the amplification factor of a small change in intensity at the switching midpoint M (r=1) is calculated from the formula:

$$\left.\dfrac{\partial I_x/\partial I_{x0}}{\vphantom{X}}\right|_{I_{x0} = R_x = 0} = R_y \text{sign}(\theta)\exp(2s)/3, \quad (7)$$

where $s = L\sqrt{U_n l/K - 1}\ = L\sqrt{R_y A/3 - 1}\ ,$ $L = 2\pi l\alpha l/\lambda$, $R_y = I_y l\theta l/(4 l\alpha l)$.

Extreme values of $T_x$ and switching depth $\Delta T$ are found from the formulas:

$$T_{x,min} = 0, T_{x,max} = \Delta T = 1 - \gamma/I_n l = 1 - 3/(4R_y).$$

With $|I_n| \gg \gamma$ we have $\Delta T \approx 1$, i.e., with adequately high intensity values self-switching becomes almost complete. Formula (7) gives much more amplification factor than a similar formula (cf., e.g., Transactions of the Academy of Sciences of the USSR, Ser.Phys., 1984, vol.48, No.7, pp.1441–1446) for $\alpha=0$; said factor becomes very high even with relatively small values of L. For instance, with $L=\pi$, $R_y=I_{y0}|\theta|/(4|\alpha|)=5$, we have $\partial I_{xl}/\partial I_{x0} \approx 10^6 R_y \approx 5 \cdot 10^6$ and $\Delta T \approx 0.85$; with $L=1.690$, and $R_y=3$ we obtain $\partial I_{xl}/\partial I_{x0} \approx 12 \cdot 10^6 R_y \approx 36 \cdot 10^6$ and $\Delta T \approx 0.75$. These data agree well with the results of the numerical solution of the original equations (1).

Figure 2:
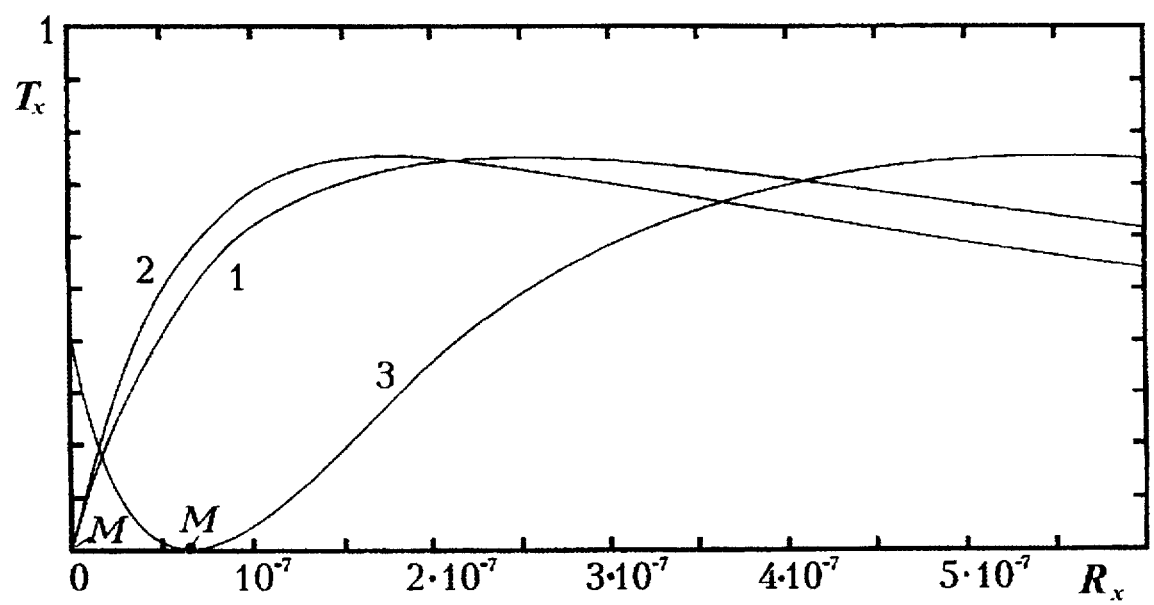
FIG. 2 shows a graphic representation of the coefficient of transfer of pumping radiation power $T_x = I_x/(I_{xo}+I_{yo})$ vs the standardized value of intensity of signal $R_y = I_{xo}|\theta|/4\gamma$, polarized orthogonally to the pumping, with $R_x << R_y = I_{yo}|\theta|/4\gamma = 3$.

Switching is possible also with $\cos(\psi_0) \neq 0$ (curve 2 in FIG. 2).

When the coupling coefficient is other than zero but is sufficiently small ($|K| \ll |\alpha|$), so the amplification factor of a small change in the signal intensity near the switching midpoint M is evaluated from the formula:

$$\frac{\partial T_x}{\partial R_x} = \frac{1}{R_y} \frac{\partial I_{xl}}{\partial I_{x0}} \approx \qquad (8)$$

$$\approx \frac{\exp(2s)}{3(R-1)} \; |\sin(\phi_0) \sqrt{R-1} - \cos(\phi_0) - \Omega| \, |\sin(\phi_0) \sqrt{R-1} - \cos(\phi_0)|,$$

where $$\Omega = \frac{K}{2\alpha} \sqrt{R_y/R_x} \; ,$$

$$s = L\sqrt{|I_n|/|\alpha|-1} \; = L\sqrt{R_y 4/3 - 1} = L\sqrt{R-1} \; ,$$

$L = 2\pi|\alpha|l/\lambda,$ $R_y = I_y|\theta|/(4|\alpha|) = 3R/4,$ $R_x = I_x|\theta|/(4|\alpha|),$ $R = I_y|\theta|/(3|\alpha|) = R_y 4/3.$ The switching midpoint M is attained with $$R_x = R_{xM} = \frac{K^2}{4\alpha^2} \frac{R_y}{|\pm \sqrt{R-1} \; \sin(\phi_0) - \cos(\phi_0)|^2} \qquad (9)$$

wherein we obtain $T_x = \min = 0$, $U=0$, $\partial T_x/\partial R_x = 0$. Thus, the point M coincides with the point $M_y$, wherein the maximum of $T_y$ is attained. This fact is one of the peculiar features of the herein considered self-switching.

If $|\sin(\phi_0) \sqrt{R-1} - \cos(\phi_0)| \ll |\Omega|$, (10)

$$\text{so} \; \frac{\partial T_x}{\partial R_x} = \frac{1}{R_y} \frac{\partial I_{xl}}{\partial I_{x0}} \approx -\frac{K}{2\alpha(R-1)} \; \frac{\exp(2s)}{3} \sqrt{R_y/R_x}$$

and we have an extremely high gain, viz. with $R_x \to 0$ we obtain $\partial T_x/\partial R_x \to \infty$ (curve 3 in FIG. 2).

BEST METHOD OF CARRYING OUT THE INVENTION

To substantiate practicability of the present Invention, the following examples are set forth hereinbelow (FIGS. 3–6).

Example 1

A pumping with a wavelength $\lambda = 1$ μm generated by a semiconductor laser 1 (FIGS. 5, 6) and polarized along the vertical axis (y) is introduced into the nonlinear optical waveguide 4 (FIGS. 5, 6) whose light-carrying conductor is made of a laminar multilayer structure (FIG. 3), such as GaAs-Ga$_x$Al$_{1-x}$As, where x=0.23, which is in fact a multiple-quantum-well (MQW) waveguide; $\theta \approx 10^{-4}$ e.s.u. A difference between the refractive indices of two orthogonally polarized waves equals $\Delta n = 3 \cdot 10^{-4} = \alpha$. The cross-sectional area is approximately $10^{-7}$ cm$^2$. The waveguide length is 1 cm. The pumping intensity is greater than $3 \cdot (c/2\pi) \cdot (\Delta n/|\theta|) \approx 10^4$ W/cm$^2$, that is, the introduced pumping power is of the order of 1 mW. After feeding to the same waveguide 4 (FIGS. 5, 6), using the mixer 3, a weak signal (of the same wavelength) from the source 2 (FIGS. 5, 6) but polarized along the horizontal axis (x) and a 0.1 mcW change in the power of said signal, the output power of the polarizer 5 (FIGS. 5, 6) changes by about 1 mW in each polarization.

Whenever the pumping polarization vector makes up an angle of $2 \cdot 5 \cdot 10^{-4}$ with the optical axis of the waveguide 4, the output power of the polarizer 5 (FIGS. 3, 5, 6) changes by about 10 mW in each polarization with the signal power changing by 0.1 mcW.

Used as a light-carrying conductor may be another multilayer (MQW) structure based on, e.g., In$_{1-x}$Ga$_x$As$_y$P$_{1-y}$, or also a nonmultilayer structure based, e.g., on GaAs, InSb, InAs, InP, an organic material, etc., having an adequately large cubic nonlinearity factor $\theta > 10^{-12}$ e.s.u. The pumping and signal wavelengths must correspond to the transparent region of the preselected light-carrying conductor.

Example 2

A pumping with a wavelength $\lambda = 0.5$ μm generated by the argon laser 1 (FIGS. 5, 6) and polarized along the vertical axis (y) is introduced into the fiber guide 4 (FIGS. 4–6) having a birefringence of the order of $10^{-7}$; $\theta \approx 10^{-13}$ e.s.u. The cross-sectional area is approximately $10^{-7}$ cm$^2$. The length of the waveguide is 10 m. The pumping intensity is greater than $3 \cdot (c/2\pi) \cdot (\Delta n/|\theta|) \approx 10^9$ W/cm$^2$, that is, the introduced pumping power is of the order of 100 W. A weak signal from the source 2 (FIGS. 5, 6) polarized along the horizontal axis (x) is fed to the same waveguide 4 (FIGS. 5, 6) with the aid of the mixer 3 (FIGS. 5, 6) and is changed by about 1 mW. The output power of the polarizer 5 (FIGS. 5, 6) changes by about 20 W in each polarization.

When the pumping polarization vector makes up an angle of $2.5 \cdot 10^{-4}$ with the optical axis of the waveguide 4 (FIGS. 5, 6), the output power of the polarizer 5 (FIGS. 5, 6) changes by about 20 mW with the signal power changing by 0.1 μW in each polarization.

INDUSTRIAL APPLICABILITY

The present invention can find application in creating optical transistors, weak signal amplifiers, optic logical devices, repeaters in optical communication lines, optical modulators, laser gates, as well as for obtaining short pulses of optical relays and registers of ultraweak signals.

We claim:

1. A method for switching optical waves having orthogonal polarizations, comprising the steps of:

directing a linearly polarized optical wave into a birefringent object; and applying an orthogonally polarized optical signal wave into said object wherein a polarization vector of a pumping wave and the signal wave is directed along the optical axis of the birefringent object at an angle less than $\pi/2$ to said optical axis, and the intensity of the pumping wave is selected to be higher than a threshold value which is derived from the following formula:

$$I_p > 2(c/2\pi)|\theta|^{-1}|\alpha|$$

where $\theta$ is the nonlinear coefficient factor of the object;

$\alpha = n_0 - n_e$ is a difference between the effective refractive indices of orthogonally polarized radiations c is the speed of light and the intensity of the signal wave is varied from zero to a maximum value of $I_s$, max<0.1 $I_p$.

2. The method as claimed in claim 1, wherein, an angle between the optical axis of the birefringent object and the polarization vector of the pumping wave is selected so as to suit the required switching mode in the range from zero to less than $\pi/2$.

3. The method as claimed in claim 2, wherein the angle between the optical axis of the birefringent object and the polarization vector of the pumping or signal wave is selected by rotating the object.

4. The method as claimed in claim 1, wherein the optical frequencies of the signal and pumping waves coincide.

5. A device for switching optical waves of orthogonal polarizations, comprising: a source of an optical signal radiation, a birefringent object (4), and a polarizer, connected in series wherein it is provided with a source of optical pumping radiation, and a mixer for spacial coinciding of the pumping radiation and the signal radiation, both said source and said mixer being situated before the object, and the pumping and signal radiations are polarized mutually orthogonally, the axis of polarization of the pumping or signal radiation either aligning with the optical axis of the birefringent object or being directed to said axis at an angle less than $\pi/10$.

6. A device for switching as set above in claim 5, wherein the birefringent object appears as an optical waveguide.

7. A device for switching as set above in claim 6, wherein the optical waveguide features a laminar light-carrying structure forming a multiplicity of quantum wells.

8. A device for switching as set above in claim 7, wherein the optical waveguide features a laminar light-carrying structure of GaAs-Ga$_x$Al$_{1-x}$As with a maximum layer of thickness of 10 microns.

9. A device for switching as set above in claim 5, wherein the birefringent object is cubic or linear.

10. A device for switching as set above in claim 9, wherein the optical waveguide features a light carrying structure having a cubic nonlinear factor $\theta > 10^{-12}$ or $\theta \approx 10^{-13}$ e.s.u.

11. A device for switching as set above in claim 5, wherein the object is rotatable with respect to the axis of the optical pumping radiation.

12. A device for switching as set above in claim 5, wherein the optical frequencies of the signal and pumping waves coincide.

13. A device for switching as set above in claim 5, wherein the birefringent objects appears as a crystal.

* * * * *